United States Patent [19]

Sato

[11] Patent Number: 5,107,438

[45] Date of Patent: Apr. 21, 1992

[54] CONTROL APPARATUS FOR INVERTER

[75] Inventor: Shinji Sato, Fuchu, Japan

[73] Assignee: Kabushiki Kaisha Toshiba, Kawasaki, Japan

[21] Appl. No.: 473,035

[22] Filed: Jan. 31, 1990

[51] Int. Cl.$^5$ .......................... G05F 1/10; H02P 9/00
[52] U.S. Cl. .................... 364/483; 364/574; 363/41; 307/359; 318/811
[58] Field of Search ............. 364/483, 481, 571.02, 364/571.05, 574, 826; 363/41, 37, 35; 307/529, 510, 359, 498; 318/811

[56] References Cited

U.S. PATENT DOCUMENTS

| | | | |
|---|---|---|---|
| 4,287,557 | 9/1981 | Brehse | 363/95 |
| 4,322,671 | 3/1982 | Kawada et al. | 318/811 |
| 4,575,667 | 3/1986 | Kurakake | 318/811 |
| 4,862,343 | 8/1989 | Nomura et al. | 363/41 |
| 4,875,149 | 10/1989 | Rozman et al. | 363/41 |
| 4,903,187 | 2/1990 | Doi et al. | 363/37 |
| 4,958,117 | 9/1990 | Kerkman et al. | 363/41 |

FOREIGN PATENT DOCUMENTS 61-139274 (A) 6/1986 Japan.
61-262088 (A) 11/1986 Japan.

OTHER PUBLICATIONS

T. Haneyoshi et al., "Waveform Compensation of PWM Inverter With Cyclic Fluctuating Loads", IEEE, vol. 24, No. 4, Jul./Aug., 1988, pp. 582-589.
Kawabata et al., "Dead Beat Control of Three Phase PWM Inverter," PESC '87 Record, 18th Annual IEEE Power Electronics Specialists Conference, Nov. 1987, pp. 473-481.
Kawabata et al., "UPS Systems Using Multi-Functional Inverters," Intelec '87 Conference Proceedings, 9th International Telecommunications Energy Conference, Jun. 1987, pp. 525-530.
Kerkman et al., "Voltage Controlled Current Regulated PWM Inverters," Conference Record of the 1988 IEEE Industry Applications Society Annual Meeting, Oct. 1988, pp. 381-387.
Dobrovolny et al., "A Phase-Locked-Loop Synchronization Scheme for Parallel Operation of Modular Power Supplies", PESC '89 Record, volume 2, 20th Annual IEEE Power Electronics Specialists Conference, Jun. 1989, pp. 861-869.

Primary Examiner—Parshotam S. Lall
Assistant Examiner—V. Trans
Attorney, Agent, or Firm—Foley & Lardner

[57] ABSTRACT

A control apparatus for an inverter including a filter consisting of a reactor and a capacitor, connected to the output terminal thereof is operative to compute such a voltage correction value to cancel a voltage difference between the reference voltage and the output voltage to add, to the voltage correction value, a value obtained by delaying the voltage correction value by one period of the inverter output voltage to prepare a reference correction value to correct the reference voltage by the reference correction value, thus to prepare a voltage command for control of the inverter. The voltage control based on the reference correction value is carried out in a feed-forward manner, thus making it possible to effectively eliminate voltage distortion appearing periodically in synchronization with the output voltage.

11 Claims, 9 Drawing Sheets

CONTROL APPARATUS FOR INVERTER

FIELD OF THE INVENTION

This invention relates to a control apparatus for a constant voltage and constant frequency inverter, and more particularly to a control apparatus for an inverter suitable for eliminating voltage waveform distortion due to a non-linear load being generated in synchronization with an output voltage period.

BACKGROUND OF THE INVENTION

Constant voltage and constant frequency (CVCF) inverters having a LC filter at the a.c. output are used as uninterruptible power supplies or stand alone power supplies for delivering power to equipment in which instantaneous service interruption is not permitted, such as a computer, etc. In most cases, there is employed, as the load, a non-linear load from which an output voltage waveform distortion is generated in synchronization with the output voltage period, such as, a d.c. load to which a power is supplied through the rectifier.

To eliminate the output voltage waveform distortion of the inverter produced by such a non-linear load, there have been proposed a method of detecting an output voltage to control the inverter output on the basis of an instantaneous value of a deviation between the output voltage detected and an output voltage reference so that the deviation becomes small, a method of allowing a current flowing in the capacitor of the LC filter to follow a sine wave, and the like.

Figure 1:
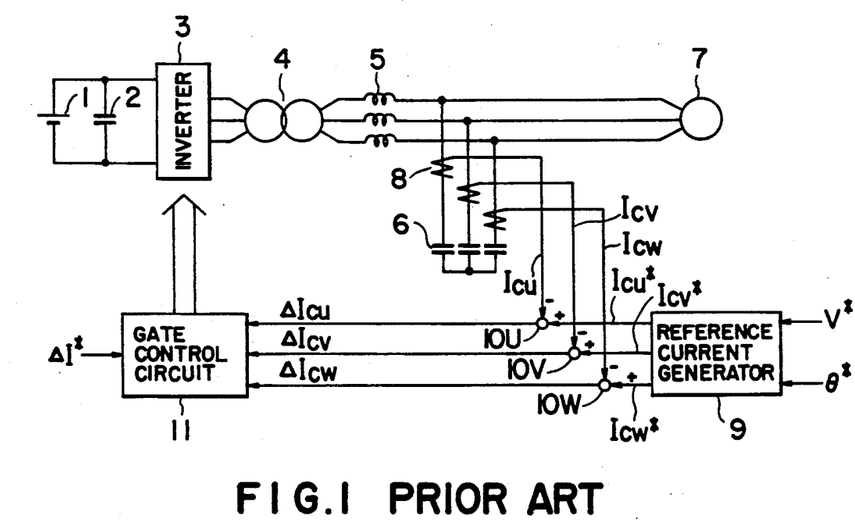
FIG. 1 is a block diagram showing a conventional control apparatus based on the instantaneous value control utilizing a current flowing in the capacitor.

Referring to FIG. 1, there is shown an apparatus in which the method of controlling the inverter so that a current flowing in the capacitor of the LC filter follows a sine wave is employed among the above methods. In this FIGURE, a d.c. output of a d.c. power supply 1 is smoothed by a smoothing capacitor 2, and is then transformed to a.c. by a three-phase inverter 3. This a.c. is transformed to a suitable voltage by an output transformer 4, and is then delivered to a load 7 through an LC filter consisting of a reactor (L) 5 and a capacitor (C) 6. The LC filter is provided in order to eliminate higher harmonics produced by the switching of the inverter 3 to deliver an a.c. voltage having less distortion in the load 7.

The current flowing in the capacitor 6 is detected for each phase by a current detector 8, and current detection signals $I_{cu}$, $I_{cv}$, $I_{cw}$ obtained as the detected result are inputted as the feedback signals to the inverter 3. Furthermore, a current reference generator 9 prepares three phase reference currents $I_{cu}^*$, $I_{cv}^*$, $I_{cw}^*$ on the basis of the reference voltage $V^*$ and the reference phase $\theta^*$.

$$I_{cu}^* = \omega C \cdot V^* \cos(\theta^*)$$

$$I_{cv}^* = \omega C \cdot V^* \cos(\theta^* - 2\pi/3)$$

$$I_{cw}^* = \omega C \cdot V^* \cos(\theta^* + 2\pi/3) \quad (1)$$

where $\omega$ is an output angular frequency (rad/sec) of the inverter 3, and C is a capacitance (F) of the capacitor 6. When the time is assumed as t, $\theta^*$ is expressed as follows:

$$\theta^* = \omega \cdot t \quad (2)$$

Deviations between these current references and the current detection signals are respectively obtained by adders 10U, 10V, 10W as follows:

$$\Delta I_{cu} = I_{cu}^* - I_{cu}$$

$$\Delta I_{cv} = I_{cv}^* - I_{cv}$$

$$\Delta I_{cw} = I_{cw}^* - I_{cw}$$

Figure 2:
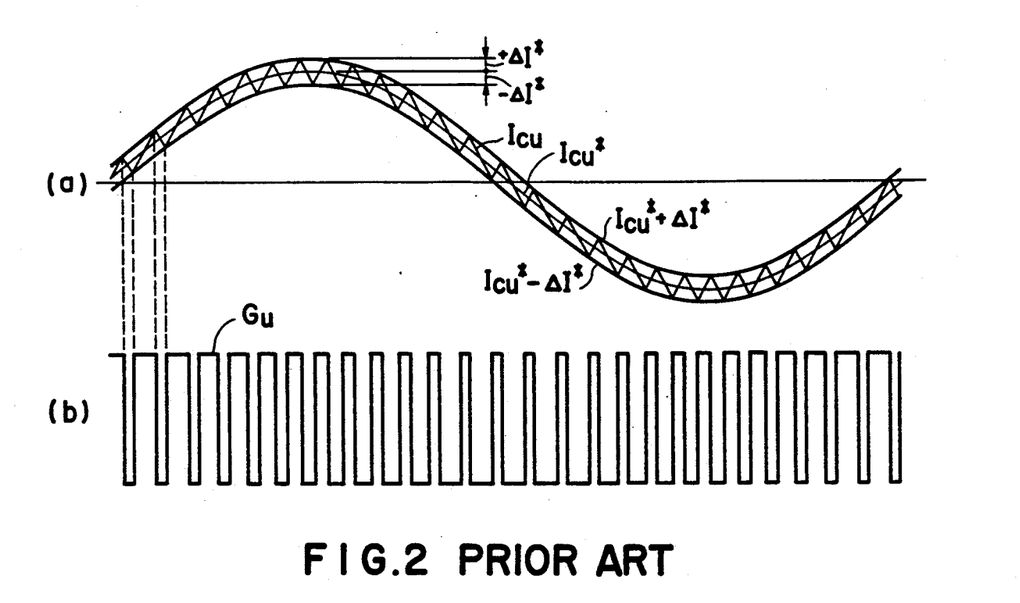
FIG. 2 is a diagram for supplementarily explaining the control apparatus shown in FIG. 1.

These deviations are delivered to a gate control circuit 11. A gate control circuit 11 prepares a pulse width modulation (PWM) pattern so as not to exceed above the hysteresis level $\pm \Delta I^*$ as shown in FIG. 2 (only U-phase is illustrated) in order to reduce these current deviations $\Delta I_{cu}$, $\Delta I_{cv}$, $\Delta I_{cw}$ to control the inverter 3 using the PWM pattern as a gate signal.

In the conventional control apparatus, for eliminating such an output voltage, there are employed a method to detect a current flowing in the filter capacitor to effect closed loop control so that the difference between the current detected and the reference current becomes small, and a method to detect an inverter output voltage to effect closed loop control so that the deviation between the voltage detected and a reference voltage becomes small, and the like. However, with these conventional control apparatus, it is difficult to sufficiently remove the waveform distortion as a result of the time delay until a control command is outputted from the detection. If one persists with such conventional control methods, a control system having a very fast response characteristic until a command is given from the detection of the output voltage, or the output current must be used.

SUMMARY OF THE INVENTION

An object of this invention is to provide a control apparatus for an inverter capable of easily eliminating an output voltage waveform distortion produced in synchronization with the output voltage period.

Another object of this invention is to provide a control apparatus for an inverter capable of satisfactorily eliminating the above-described voltage waveform distortion even in a control system where the response characteristic is a characteristic of which response speed is not so high, or in a control system where the control gain is not large.

To achieve these objects, in accordance with this invention, there is provided a control apparatus for an inverter comprising a filter consisting of a reactor and a capacitor, connected to the a.c. output terminal of the inverter, first means for detecting an output voltage of the filter, second means for producing a reference voltage for the output of the filter, third means for computing a voltage deviation between the reference voltage and the output voltage, fourth means for outputting such a voltage correction value to cancel the voltage deviation after a delay time by one period of an inverter output voltage, fifth means for computing a sum of the reference voltage and an output from the fourth means to output it as a voltage command, and sixth means for controlling the magnitude and the phase of the output voltage of the inverter in accordance with the voltage command obtained by the fifth means.

In accordance with this invention, attention is drawn to a voltage distortion appearing periodically and repeatedly in synchronization with the output voltage to determine such a correction reference voltage to cancel an output voltage distortion before one period, to thus apply it to the reference voltage in a feed-forward manner. By eliminating those distortion components by repetitive control, high quality steady state voltage waveform can be provided.

BRIEF DESCRIPTION OF THE DRAWINGS

FIGS. 4a to 4d and 5a to 5e are explanatory views for explaining the operation of the control apparatus shown in FIG. 3, FIGS. 6 and 7 are block diagrams showing different modifications with respect to the control apparatus shown in FIG. 3, respectively.

DETAILED DESCRIPTION OF THE PREFERRED EMBODIMENTS

Figure 3:
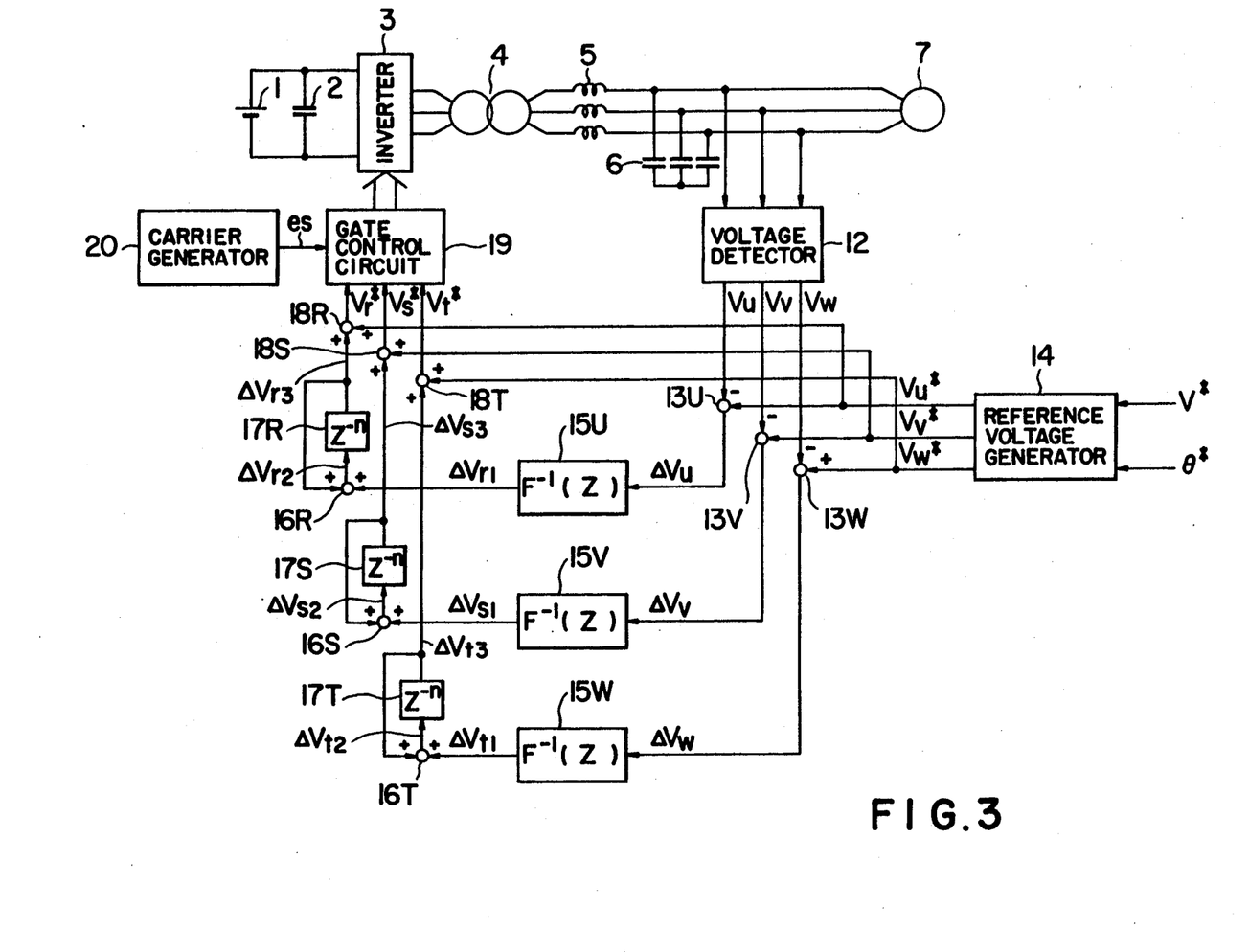
FIG. 3 is a block diagram showing an arrangement of an embodiment according to this invention.

FIG. 3 is a block diagram showing an arrangement of an embodiment according to this invention in conjunction with an inverter main circuit to which this invention is applied. In FIG. 3, the inverter main circuit is composed of a d.c. power supply 1, a smoothing capacitor 2, a three-phase inverter 3, an output transformer 4, a filter reactor 5, a filter capacitor 6, and a load 7. The control of this main circuit is conducted on the basis of sampling results of n times per each period of the output voltage wherein its sampling period is represented by T.

Phase output voltages $V_u$, $V_v$, $V_w$ are detected by a voltage detector 12 at the output terminal of the filter consisting of reactor 5 and capacitor 6, and are then applied to adders 13U, 13V, 13W as their first inputs in the negative sign, respectively. Thus, three-phase voltage references $V_u^*$, $V_v^*$, $V_w^*$ expressed by the following equations are generated by a reference voltage generator 14 on the basis of the output reference voltage $V^*$ and the reference phase $\theta^*$:

$$V_u^* = V^* \cdot \cos(\theta^*)$$

$$V_v^* = V^* \cdot \cos(\theta^* + 2\pi/3)$$

$$V_w^* = V^* \cdot \cos(\theta^* + 2\pi/3) \quad (3)$$

When the output angular frequency of the inverter 3 is represented by $\omega$ (rad/sec), $\theta^* = \omega \cdot t$. As their second inputs of the adders 13U, 13V, 13W, reference voltages $V_u^*$, $V_v^*$, $V_w^*$ obtained by the reference voltage generator 14 are applied in the positive sign.

These adders 13U, 13V, 13W deliver voltage deviations $\Delta V_u$, $\Delta V_v$, $\Delta V_w$ expressed by the following equations every phase, respectively.

$$\Delta V_u = V_u^* - V_u$$

$$\Delta V_v = V_v^* - V_v$$

$$\Delta V_w = V_w^* - V_w \quad (4)$$

Voltage correction value computing elements 15U, 15V, 15W compute voltage correction values for repetitive control $\Delta V_{rl}$, $\Delta V_{sl}$, $\Delta V_{tl}$ for canceling voltage deviations $\Delta V_u$, $\Delta V_v$, $\Delta V_w$ obtained as stated above, respectively. These voltage correction values provide a function output corresponding to the inverse transfer function of the filter consisting of reactor 5 and capacitor 6, and this function is expressed as follows:

$$F^{-1}(Z) = \frac{Z^{+1} - 2 \cdot \cos(\omega_F T) + Z^{-1}}{\omega_F \cdot T \cdot \sin(\omega_F T)} \quad (5)$$

where $\omega_F$ is a resonant angular frequency determined by the inductance L (H) of the reactor 5 and the capacitance C (F) of the capacitor 6 and the relationship expressed as $\omega_F = 1/\sqrt{L \cdot C}$ holds, and $Z^{-1}$ is a delay operator and T is a delay time thereof. For example, $Z^{-1} \cdot f(t)$ can be written into $f(t-T)$. When it is assumed that the inverter output voltage period is $T_0$ and n satisfies the relationship expressed as $T_0 = n \cdot T$, $Z^{-n} \cdot f(t)$ is expressed as $f(t-n \cdot T) = f(t-T_0)$. This value becomes in correspondence with the value of f(t) before one period. In addition, $Z^{+1}$ is a predictive operator for determining the value after the time T.

Figure 4:
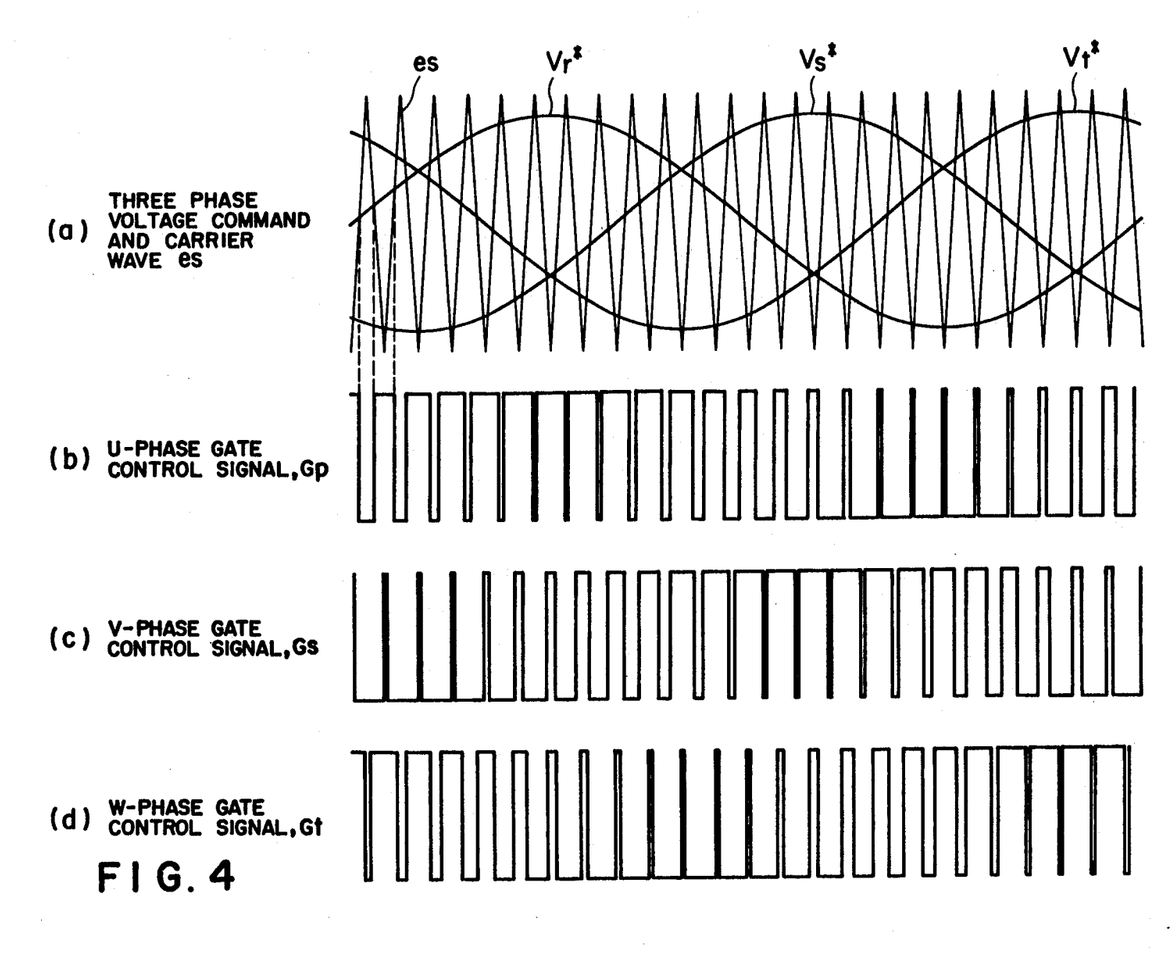

The voltage correction values $\Delta V_{rl}$, $\Delta V_{sl}$, $\Delta V_{tl}$ obtained by the voltage correction computing elements 15U, 15V, 15W are delivered as their first inputs to the adders 16R, 16S, 16T, respectively. Furthermore, delay elements 17R, 17S, 17T are connected between the outputs of the adders 16R, 16S, 16T and their second inputs thereof, respectively. These delay elements 17R, 17S, 17T are circuit elements for delaying the outputs $\Delta V_{r2}$, $\Delta V_{s2}$, $\Delta V_{t2}$ of the adders 16R, 16S, 16T by one period $T_0 = n \cdot T$ of the inverter output voltage, respectively. They may be easily realized by using, e.g., a RAM of the first-in/first-out (FIFO) type. The adders 16R, 16S, 16T add the voltage correction values $\Delta V_{rl}$, $\Delta V_{sl}$, $\Delta V_{tl}$ obtained by the voltage correction value computing elements 15U, 15V, 15W and voltage correction values $\Delta V_{r3}$, $\Delta V_{s3}$, $\Delta V_{t3}$ before one period obtained as the outputs of the delay elements 17R, 17S, 17T to further apply added values to the inputs of the delay elements 17R, 17S, 17T, respectively. As a result of the fact that voltage correction values $\Delta V_{r3}$, $\Delta V_{s3}$, $\Delta V_{t3}$ obtained as the outputs of the delay elements 17R, 17S, 17T are respectively added, by adders 18R, 18S, 18T, to reference voltages $V_u^*$, $V_v^*$, $V_w^*$ generated by the reference voltage generator 14, voltage commands $V_r^*$, $V_s^*$, $V_t^*$ are provided, and they are delivered to a gate control circuit 19. The gate control circuit 19 modulates threephase voltage commands $V_r^*$, $V_s^*$, $V_t^*$ by a triangular carrier wave is generated by a carrier wave generator 20 and having a frequency sufficiently higher than the inverter output frequency as shown in FIG. 4 to prepare three-phase PWM gate signals Gr, Gs, Gt, thereby to control the inverter 3 so that a voltage appearing on the output terminal of the filter consisting of reactor 5 and capacitor 6 becomes equal to a predetermined value.

Figure 5:
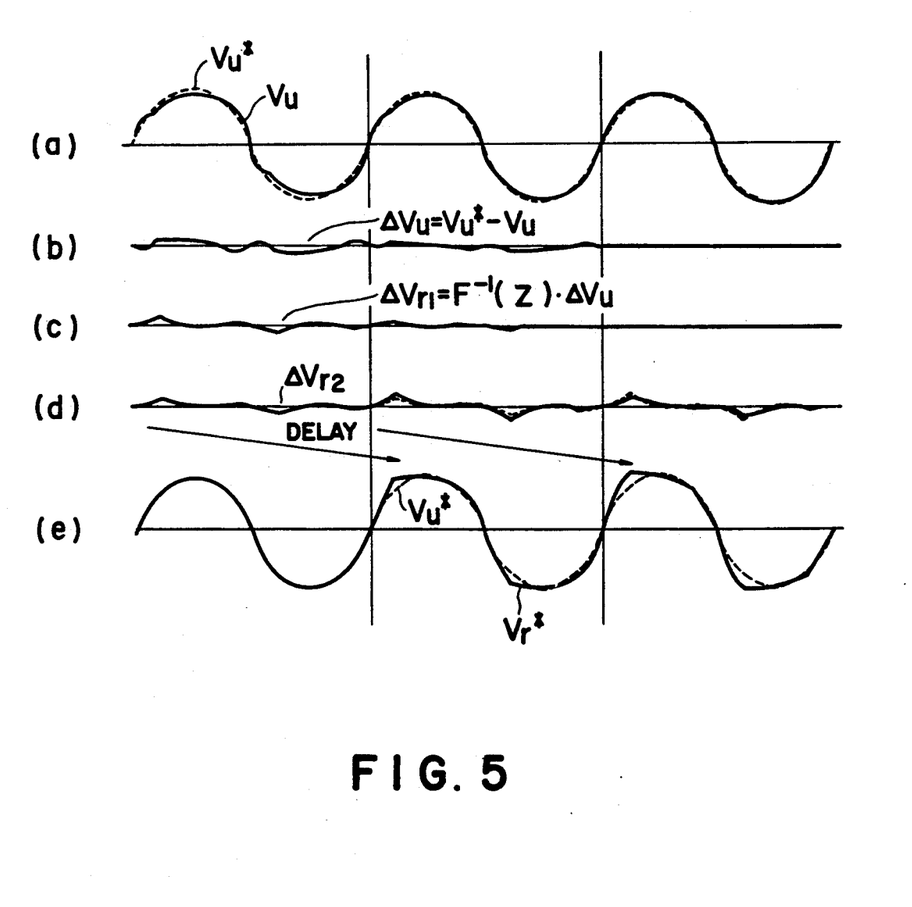

FIG. 5 is a waveform diagram showing signals with respect to the U-phase and R-phase of the above-mentioned respective signals, i.e., detected output voltage $V_u$ (output from the voltage detector 12), voltage reference $V_u^*$ (output from the reference voltage generator 14), voltage deviation $\Delta V_u$ (output from the adder 13U), voltage correction value $\Delta V_{rl}$ (output from the voltage correction computing element 15U), voltage correction value $\Delta V_{r2}$ * (output from the adder 16R), and voltage command $V_r^*$ (output from adder 18R). When a deviation $\Delta V_u$ occurs between the output voltage $V_u$ and the reference voltage $V_u^*$ (see FIGS. 5a, 5b). The voltage correction computing element 15U computes a voltage correction value $\Delta V_{r1}$ in order to cancel this deviation (see FIG. 5c). The adder 16R computes a voltage correction value $\Delta V_{r2}$ corresponding to sum of the voltage correction value $\Delta V_{r1}$ of the present period and a voltage correction value $\Delta V_{r3}$ delayed by one period (see FIG. 5d). By adding, to the reference voltage $V_u^*$, the voltage correction value $\Delta V_{r3}$ obtained by delaying the voltage correction value $\Delta V_{r2}$ by one period, a voltage command $V_r^*$ is provided. On the basis of the voltage command $V_r^*$ thus obtained, the gate control circuit 19 effects PWM control of the inverter 3.

As described above, this invention executes such a control to provide a voltage correction value delayed by one period by making use of the periodicity of the output voltage distortion to thereby correct the reference voltage, thereby making it possible to satisfactorily eliminate a voltage distortion through a repetitive control using a control apparatus having a response characteristic identical to that of the conventional apparatus, thus to provide an output voltage having a satisfactory waveform.

In the embodiment shown in FIG. 3, a predictive operator $Z^{+1}$ element is included in the voltage correction computing elements 15U, 15V, 15W. In contrast, in another embodiment shown in FIG. 6, such a predictive operator is not included.

Figure 6:
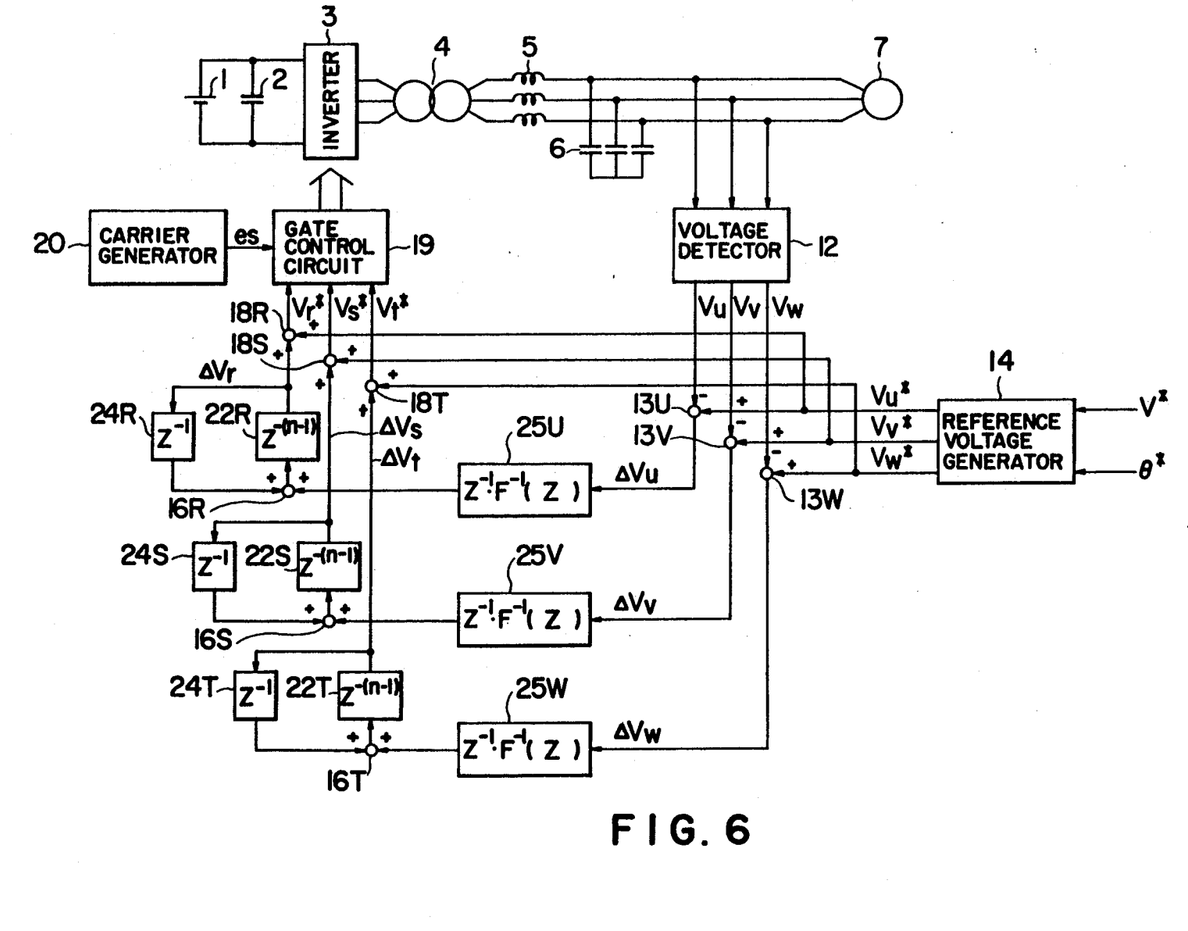

In the embodiment shown in FIG. 6, there are provided voltage correction computing elements 25U, 25V, 25W including no predictive operator element at the output terminals of the adders 13U, 13V, 13W. The transfer function of these voltage correction computing elements is expressed by the following equation:

$$Z^{-1} \cdot F^{-1}(Z) = \frac{1 - 2 \cdot Z^{-1} \cdot \cos(\omega_F T) + Z^{-2}}{\omega_F \cdot T \cdot \sin(\omega_F T)} \quad (6)$$

where $Z^{-2}$ is a delay operator for the delay time 2T. The outputs of the voltage correction computing elements are connected to the first inputs of the adders 16R, 16S, 16T, respectively. To the output terminals of the adders 16R, 16S, 16T, delay elements 22R, 22S, 22T having a delay time $(n-1) \cdot T$ are connected. Between the output terminals of the delay elements 22R, 22S, 22T and the second input terminals of the adders 16R, 16S, 16T, delay elements 24R, 24S, 24T having a delay time T are connected. The output terminals of the delay elements 22R, 22S, 22T are also connected to the input terminals of the adders 18R, 18S, 18T.

In accordance with the embodiment shown in FIG. 6, the delay time $n \cdot T = T_0$ is provided by the voltage correction computing elements 25U, 25V, 25W and the delay elements 22R, 22S, 22T, and the delay time $T_0$ is similarly provided by the delay elements 22R, 22S, 22T and the delay elements 24R, 24S, 24T. Accordingly, this embodiment can also provide an effect identical to that of the embodiment shown in FIG. 3.

Figure 7:
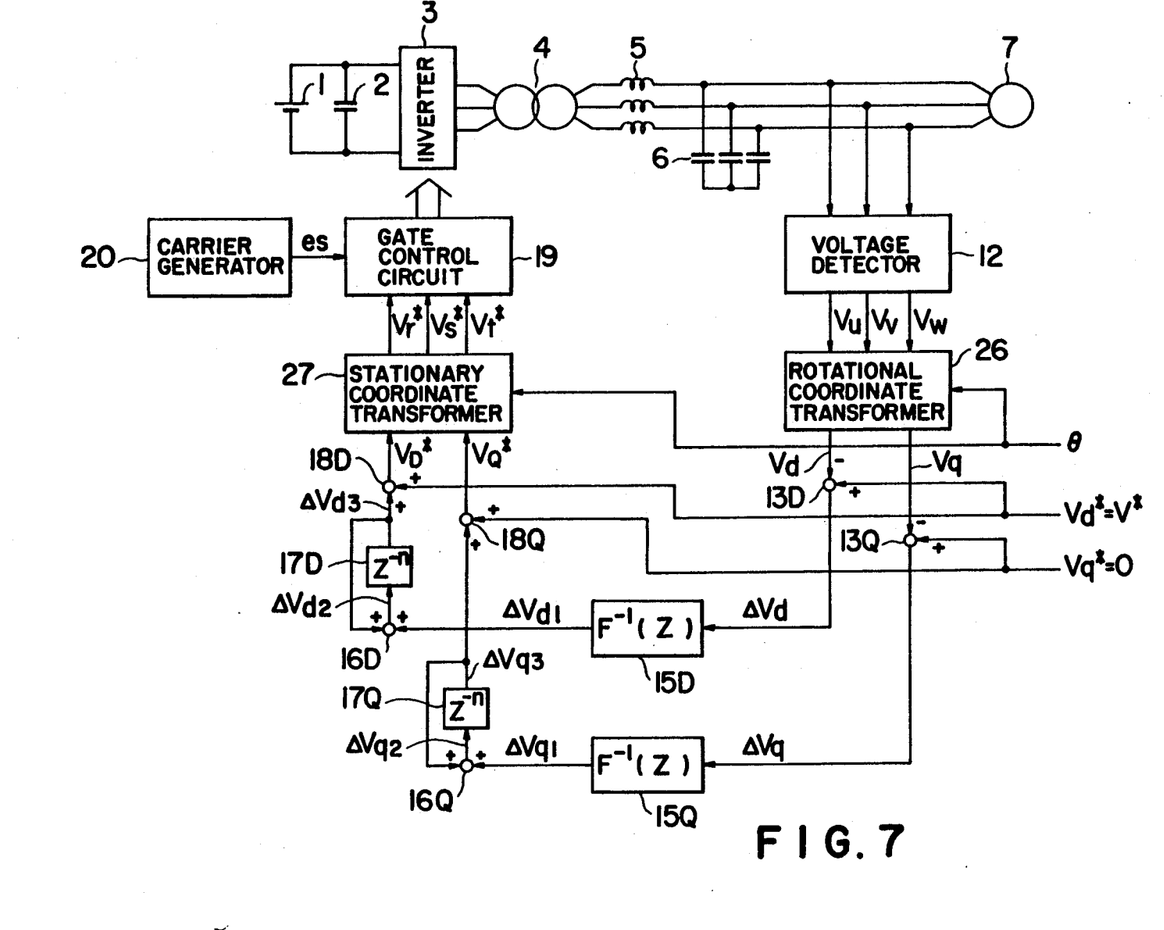

FIG. 7 shows an embodiment constructed to once transform a controlled variable to that in the rotational coordinate system, to thus effect a control. In the embodiment of FIG. 3 previously shown, variables indicative of detection and command are a.c. variables rotating at a constant angular frequency $\omega$, and all variables include frequency component. In contrast, the embodiment shown in FIG. 7 is advantageously still more simplified because there is no need to take, as the frequency component, all variables for the control operation into consideration, but it is sufficient to take them into consideration as a direct current. The output voltages $V_u$, $V_v$, $V_w$ detected by the voltage detector 12 and expressed by the stationary coordinate is transformed to output voltages $V_d$, $V_q$ expressed by the rotational coordinate by a coordinate transformer 26 using a reference phase $\theta^*$. In this instance, $V_d$ and $V_q$ are expressed by the following equations.

$$\begin{aligned}
V_d &= (\tfrac{2}{3})\{V_u \cdot \cos(\theta^*) + V_v \cdot \cos(\theta^* - 2\pi/3) + \\
&\quad V_v \cdot \cos(\theta^* - 2\pi/3) + V_w \cdot \cos(\theta^* + 2\pi/3)\} \\
V_q &= (\tfrac{2}{3})\{V_u \cdot \sin(\theta^*) + V_v \cdot \sin(\theta^* - 2\pi/3) + \\
&\quad V_w \cdot (\sin\theta^* + 2\pi/3)\}
\end{aligned} \quad (7)$$

Similarly a pair of reference voltages $V_d^*$ and $V_q^*$ are formed as the following expression:

$$V_d^* = V^*, \quad V_q^* = 0 \quad (8)$$

By adders 13D, 13Q, voltage deviations $\Delta V_d$ and $\Delta V_q$ are determined as $\Delta V_d = V_d^* - V_d$ and $\Delta V_q = V_q^* - V_q$, respectively. The voltage correction computing elements 15D, 15Q determines voltage correction values $\Delta V_{dl}$, $\Delta V_{ql}$ for canceling the voltage deviations $\Delta V_d$, $\Delta V_q$ in completely the same manner as in the previously described voltage correction computing elements 15U, 15V, 15W. The functions of the adders 16D, 16Q correspond to those of the adders 16U, 16V, 16W. These adders 16D and 16Q compute the sum of voltage correction values $\Delta V_{dl}$, $\Delta V_{ql}$ and the voltage correction values $\Delta V_{d3}$, $\Delta V_{q3}$ obtained as the outputs of the delay elements 17D, 17Q (corresponding to the delay elements 17U, 17V, 17W). By the adders 18D and 18Q, reference voltages $V_D^*$, $V_Q^*$ corrected by adding voltage correction values $\Delta V_{d3}$, $\Delta V_{q3}$ to the reference voltages $V_d^*$, $V_q^*$ are provided. The reference voltages $V_D^*$, $V_Q^*$ thus obtained are transformed to voltage commands $V_r^*$, $V_s^*$, $V_t^*$ expressed by the stationary coordinate in accordance with the following equation by a stationary coordinate transformer 27 using the reference phase $\theta^*$.

$$\begin{aligned}
V_r^* &= V_D^* \cdot \cos(\theta^*) + V_Q^* \cdot \sin(\theta^*) \\
V_s^* &= V_D^* \cdot \cos(\theta^* - 2\pi/3) + \\
&\quad V_Q^* \cdot \sin(\theta^* - 2\pi/3) \\
V_t^* &= V_d^* \cdot \cos(\theta^* + 2\pi/3) + \\
&\quad V_Q^* \sin(\theta^* + 2\pi/3)
\end{aligned} \quad (9)$$

The voltage commands obtained in this way are entirely the same as those in FIG. 3. In accordance with this embodiment, since all controlled variables can be dealt as d.c., the error is small and it is sufficient for the quantity of control operations is small.

Figure 8:
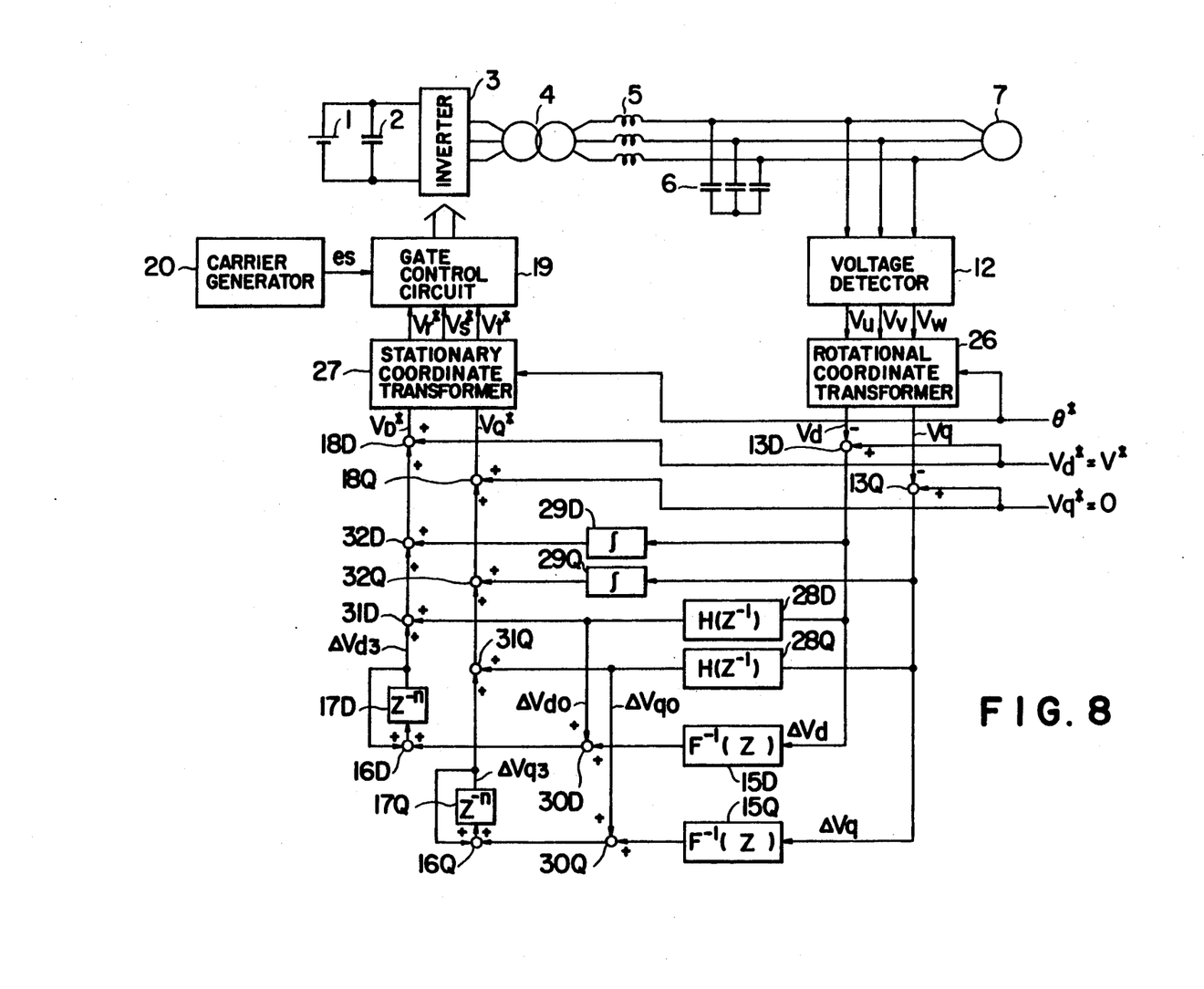
FIGS. 8, 9 and 10 are block diagrams showing different embodiments of control apparatus in which instantaneous value control is combined with the repetitive control proposed in this invention, respectively.

FIG. 8 shows an embodiment in which the instantaneous value control is jointly applied to the control apparatus shown in FIG. 7. In the control apparatus shown in FIG. 7, since control is not substantially conducted for one period after voltage distortion has occurred, bad response results with respect to a stepwise load change. The embodiment shown in FIG. 8 is characterized in that the instantaneous value control is additionally conducted in order to improve response with respect to a step-shaped load change.

In the embodiment shown in FIG. 8, transient control computing elements 28D, 28Q to which voltage deviations $\Delta V_d$, $\Delta V_q$ are inputted and integrators 29D, 29Q having an integral gain $K_i$ are additionally provided at the output terminals of the adders 13D, 13Q, respectively. With the alteration stated above, adders 30D, 30Q are provided between the voltage correction computing elements 15D, 15Q and the adders 16D, 16Q, and two sets of adders 31D, 31Q and 32D, 32Q are provided between the delay elements 17D, 17Q and the adders 18D, 18Q, respectively. The outputs from the transient control computing elements 28D, 28Q are added to the outputs from the voltage correction computing elements 15D, 15Q in the adders 30D, 30Q, and are added to the outputs from the delay elements 17D, 17Q in the adders 31D, 31Q. Furthermore, the outputs from the integrators 29D, 29Q are added to the outputs of the adders 31D, 31Q in the adders 32D, 32Q, respectively.

In the embodiment shown in FIG. 8, when an error occurs in the output voltage, a controlled variable is fed back as the instantaneous value through the transient control computing elements 28D, 28Q in order to reduce distortion. Furthermore, where a change is produced in the output voltage, the voltage deviation is integrated by the integrators 29D, 29Q, and an integral gain $K_i$ is further multiplied by the integrated voltage deviation and is then fed back. Thus, control is performed so that the output voltage becomes constant. At the next period, since the transient controlled variables $\Delta_{d0}$, $\Delta_{q0}$ added at this period and the variable obtained by multiplying the deviations $\Delta V_d$, $\Delta V_q$, which have not been completely eliminated by the transient control, by the transfer function $F^{-1}(Z^{-1})$ of the voltage correction computing elements 15D, 15Q are superimposed on the inverter voltage command, distortion can be eliminated at the second period if the output voltage has periodicity.

Figure 9:
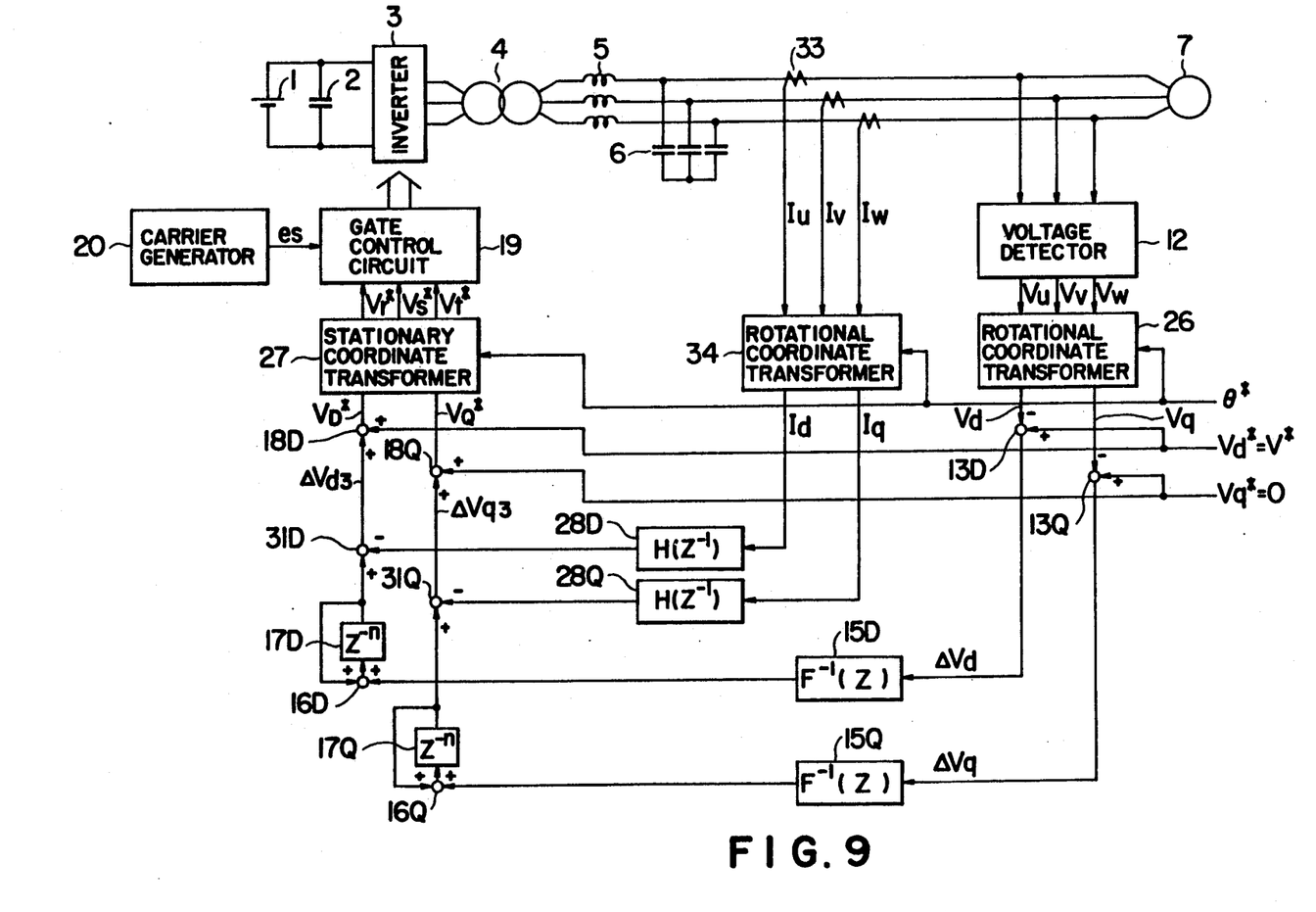
Figure 10:
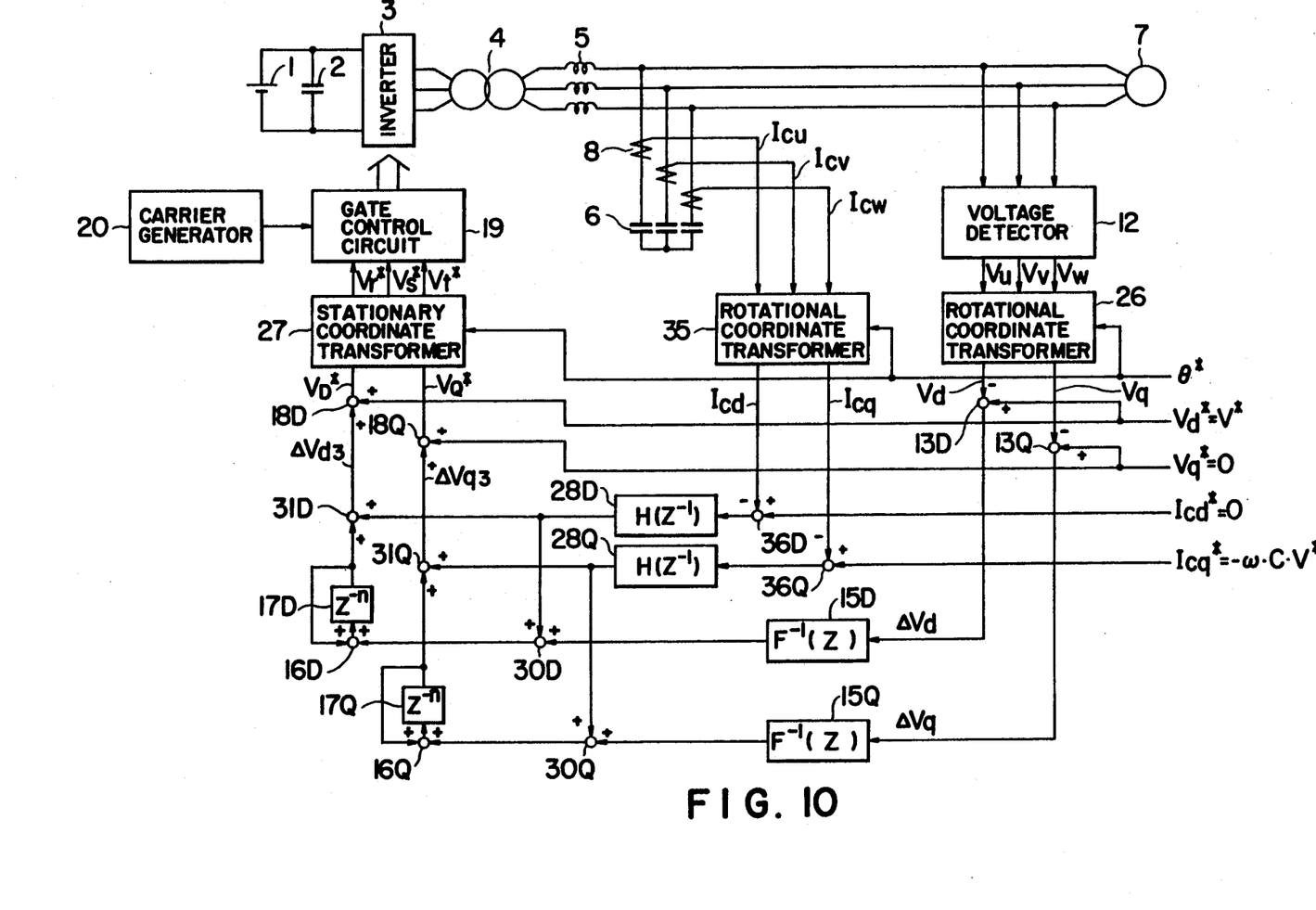

Other different embodiments jointly using the instantaneous value control are shown in FIGS. 9 and 10, respectively.

FIG. 9 shows the embodiment including a feedback system for a load current. Load currents $I_u$, $I_v$, $I_w$ detected by a current detector 33 are transformed to load currents $I_d$, $I_q$ expressed by the rotational coordinate by a rotational coordinate transformer 34. These load currents $I_d$, $I_q$ are subjected to negative feedback to the adders 31D, 31Q through transient control computing elements 28D, 28Q.

FIG. 10 shows the embodiment including a feedback system for a capacitor current. Capacitor currents $I_{cu}$, $I_{cv}$, $I_{cw}$ detected by the current detector 8 are transformed to capacitor currents $I_{cd}$, $I_{cq}$ expressed by the rotational coordinate by a rotational coordinate transformer 35. On the other hand, it is now assumed that the capacitor reference currents $I_{cd}^*$, $I_{cq}^*$ expressed by the rotational coordinate are respectively given as follows:

$$I_{cd}^* = 0, \quad I_{cq}^* = -\omega \cdot C \cdot V^* \qquad (10)$$

where $\omega$ is an angular frequency of the output voltage, C is a capacitance of the capacitor 6, and $V^*$ is an output reference voltage. Deviations between capacitor current references $I_{cd}^*$, $I_{cq}^*$ and capacitor currents $I_{cd}$, $I_{cq}$ are calculated by adders 36D and 36Q, respectively. The deviations thus obtained are, on one hand, added to the outputs of the voltage correction computing elements 15D, 15Q by adders 30D, 30Q and, are, on the other hand, added to the outputs of the delay elements 17D, 17Q by adders 31D, 31Q.

As stated above, repetitive control is carried out in conjunction with instantaneous value feedback control for the load current or the capacitor current, whereby an excellent control can be realized in both the transient characteristic and the steady-state characteristic.

What is claimed is:

1. A control apparatus for an inverter comprising:
    a filter consisting of a reactor and a capacitor, connected to the a.c. output terminal of said inverter;
    first means for detecting an output voltage from said filter;
    second means for producing a reference voltage as an output from said filter;
    third means for computing a voltage deviation between said reference voltage and said output voltage,
    fourth means for outputting a voltage correction value to cancel said voltage deviation after a delay time by one period of an inverter output voltage;
    fifth means for computing a sum of said reference voltage and an output from said fourth means to output said sum as a voltage command; and
    sixth means for controlling the magnitude and the phase of the output voltage of said inverter in accordance with said voltage command obtained by said fifth means.

2. A control apparatus as set forth in claim 1, wherein said fourth means comprises voltage correction value computing means having a transfer function expressed by the following equation:

$$F^{-1}(Z) = \frac{Z^{+1} - 2 \cdot \cos(\omega_F T) + Z^{-1}}{\omega_F \cdot T \cdot \sin(\omega_F T)}$$

where $Z^{+1}$ is a predictive operator for determining a value after the time T, $Z^{-1}$ is a delay operator for the delay time T, $\omega_F$ is a resonant angular frequency determined by the inductance L of said reactor and the capacitance C of said capacitor and is expressed as $\omega_F = 1/\sqrt{L \cdot C}$, and comprises delay means for delaying an output of said voltage correction value computing means by one period of said inverter output voltage.

3. A control apparatus as set forth in claim 1, wherein said fourth means comprises voltage correction value computing means having a transfer function expressed by the following equation:

$$Z^{-1} \cdot F^{-1}(Z) = \frac{1 - 2 \cdot Z^{-1} \cdot \cos(\omega_f T) + Z^{-2}}{\omega_F \cdot T \cdot \sin(\omega_F T)}$$

where $Z^{-1}$ is a delay operator for the delay time T, $Z^{-2}$ is a delay operator for the delay time 2T, $\omega_F$ is a resonant angular frequency determined by the inductance L of the reactor and the capacitance C of said capacitor and is expressed as $\omega_F = 1/\sqrt{L \cdot C}$, and comprises delay means for delaying an output of said voltage correction value computing means by a time obtained by subtracting said time T from one period of said inverter output voltage.

4. A control apparatus for an inverter comprising:
    a filter consisting of a reactor and a capacitor, connected to the a.c. output terminal of said inverter,
    first means for detecting an output voltage from said filter;
    second means for transforming the output voltage detected by said first means to that in the rotational coordinate system;

third means for providing a reference voltage as an output from said filter expressed by the rotational coordinate;

fourth means for computing a voltage deviation between said reference voltage delivered from said third means and the output voltage delivered from said second means;

fifth means for outputting a voltage correction value to cancel said voltage deviation after a delay time by one period of an inverter output voltage;

sixth means for computing a sum of the reference voltage generated by said third means and an output from said fifth means to output it as a voltage command;

seventh means for transforming said voltage command to that in the stationary coordinate system; and eighth means for controlling the magnitude and the phase of an output voltage from said inverter in accordance with the voltage command obtained by said seventh means.

5. A control apparatus as set forth in claim 4, wherein said fifth means comprises voltage correction value computing means having a transfer function expressed by the following equation:

$$F^{-1}(Z) = \frac{Z^{+1} - 2 \cdot \cos(\omega_F T) + Z^{-1}}{\omega_F \cdot T \cdot \sin(\omega_F T)}$$

where $Z^{+1}$ is a predictive operator for determining a value after the time T, $Z^{-1}$ is a delay operator for the delay time T, $\omega_F$ is a resonant angular frequency determined by the inductance L of said reactor and the capacitance C of said capacitor and is expressed as $\omega_F = 1/\sqrt{L \cdot C}$, and comprises delay means for delaying an output of said voltage correction value computing means by one period of said inverter output voltage.

6. A control apparatus as set forth in claim 5, which further comprises transient control computation means for performing a transient control computation on the basis of the voltage deviation outputted from said fourth means to modify an output from said voltage correction value computing means and an output from said delay means by the output obtained by said transient control computation.

7. A control apparatus as set forth in claim 5, which further comprises integral control means for performing an integral control computation on the basis of the voltage deviation outputted from said fourth means to modify an output from said delay means by the output obtained by the integral control computation.

8. A control apparatus as set forth in claim 4, which further comprises a current feedback loop for instantaneous value control for an inverter output current.

9. A control apparatus as set forth in claim 8, wherein said current feedback loop comprises a current detector for detecting said inverter output current, means for transforming an inverter output current detected by said current detector to that in the rotational coordinate system, and transient control computation means for implementing a transient control computation on said inverter output current transformed to that in the rotational coordinate system to provide a voltage correction value to modify the output from said delay means by said voltage correction value.

10. A control apparatus as set forth in claim 4, which further comprises a current feedback loop for instantaneous value control for a current flowing in said capacitor.

11. A control apparatus as set forth in claim 10, wherein said current feedback loop comprises a current detector for detecting a current flowing in said capacitor, means for transforming said capacitor current detected by said current detector to that in the rotational coordinate system, and transient control computation means for implementing a transient control computation to said capacitor current transformed to that in the rotational coordinate system to modify an output from a voltage correction value computing means and an output from said delay means by said voltage correction value.

* * * * *